United States Patent [19]

Godbole

[11] 4,377,860

[45] Mar. 22, 1983

[54] BANDWIDTH REDUCTION METHOD AND STRUCTURE FOR COMBINING VOICE AND DATA IN A PCM CHANNEL

[75] Inventor: Vishwas R. Godbole, San Jose, Calif.

[73] Assignee: American Microsystems, Inc., Santa Clara, Calif.

[21] Appl. No.: 222,702

[22] Filed: Jan. 5, 1981

[51] Int. Cl.³ .............................................. H04J 3/16
[52] U.S. Cl. ..................................... 370/84; 370/119; 375/25; 375/121
[58] Field of Search .................... 370/84, 119; 375/25, 375/121

[56] References Cited

U.S. PATENT DOCUMENTS

| | | | |
|---|---|---|---|
| 3,207,851 | 9/1965 | Fukinuki ................................. | 375/25 |
| 3,796,835 | 3/1974 | Closs et al. ............................. | 370/84 |
| 3,864,524 | 2/1975 | Walker ................................... | 370/84 |
| 3,987,251 | 10/1976 | Texier et al. .......................... | 370/84 |
| 4,143,242 | 3/1979 | Horiki ................................... | 370/84 |

*Primary Examiner*—Glen R. Swann, III
*Attorney, Agent, or Firm*—Alan H. MacPherson; Steven F. Caserza; Richard Franklin

[57] ABSTRACT

In the present invention, analog voice information is sampled at a first sampling rate, during periods when voice information is to be transmitted at a frequency which provides a digitized voice rate equal to the transmission rate capability of the transmission channel. During periods when both voice and data are to be transmitted, the analog voice information is sampled at a second sampling rate less than the first sampling rate, thus allowing the merged voice and data information to have a total digitized transmission rate equal to the transmission rate capability of the transmission channel.

11 Claims, 9 Drawing Figures

BANDWIDTH REDUCTION METHOD AND STRUCTURE FOR COMBINING VOICE AND DATA IN A PCM CHANNEL

BACKGROUND OF THE INVENTION

1. Field of the Invention

This invention relates to communication systems, and more specifically to a system capable of transmitting voice information and data information over a single pulse code modulation channel.

2. Description of the Prior Art

Systems employing pulse code modulation (PCM) are well-known in the prior art. For example, telephone communication systems often utilize pulse code modulation, in which an analog voice signal is converted to a series of binary pulses. Such telephone communication systems utilize a fixed sampling rate, commonly eight (8) kilohertz. By converting the sampled speech signal to an eight (8) bit word, the digitized speech is transmitted by pulse code modulation at 64 kilobits per second. Prior art speech transmission utilizes a fixed sampling rate, due to the fact that prior art filters utilize RC circuits to provide the filter characteristics. Utilizing fixed resistors and capacitors, the characteristics of prior art filters are also fixed.

Data transmission, such as from a computer or microprocessor, also utilizes a series of binary pulses. One common data transmission rate is 9.6 kilobits per second.

Prior art methods of transmitting both speech and data require either separate voice and data transmission channels, or a single channel of increased bandwidth capable of carrying both data and speech. Thus, for a voice transmission of 64 kilobits per second to be combined with a data transmission of 9.6 kilobits per second, a transmission channel capable of carrying 73.6 kilobits per second is required. In many instances this is not practical or possible. For example, standard PCM channels and equipment are designed to be capable of handling 64 kilobits per second, and it is not possible to transmit information in excess of this rate, without redesigning the receiving equipment.

SUMMARY OF THE INVENTION

This invention utilizes a unique technique, wherein a single voice channel capable of carrying 64 kilobits per second may be utilized to carry either voice information, data information, or a combination of voice information and data information. This is accomplished by utilizing a unique dual sample rate for the voice information involving a first sampling rate when only voice information is to be transmitted and a second, lower, sampling rate when both voice and data information is to be transmitted.

Thus in one embodiment a sampling rate of eight (8) kilohertz is used to provide a pulse code modulated voice signal of 64 kilobits per second during the interval when voice information is transmitted while during the periods when a combination of voice information and data information (or data information alone) is transmitted, a voice sampling rate of 6.8 kilohertz is utilized, resulting in a digitzed voice rate of 54.4 kilobits per second. This 54.4 kilobits per second voice rate allows the addition of data information, at a rate of 9.6 kilobits per second, thus allowing simultaneous voice information and data information transmission over a single 64 kilobits per second pulse code modulation voice channel. The reduction in voice bandwidth from 3.4 kilohertz to 2.9 kilohertz during data transmission periods does not degrade speech quality significantly, thus allowing transmission of high quality speech and data information simultaneously over a standard 64 Kilobit/sec telephone system.

DETAILED DESCRIPTION OF THE INVENTION

Figure 1:
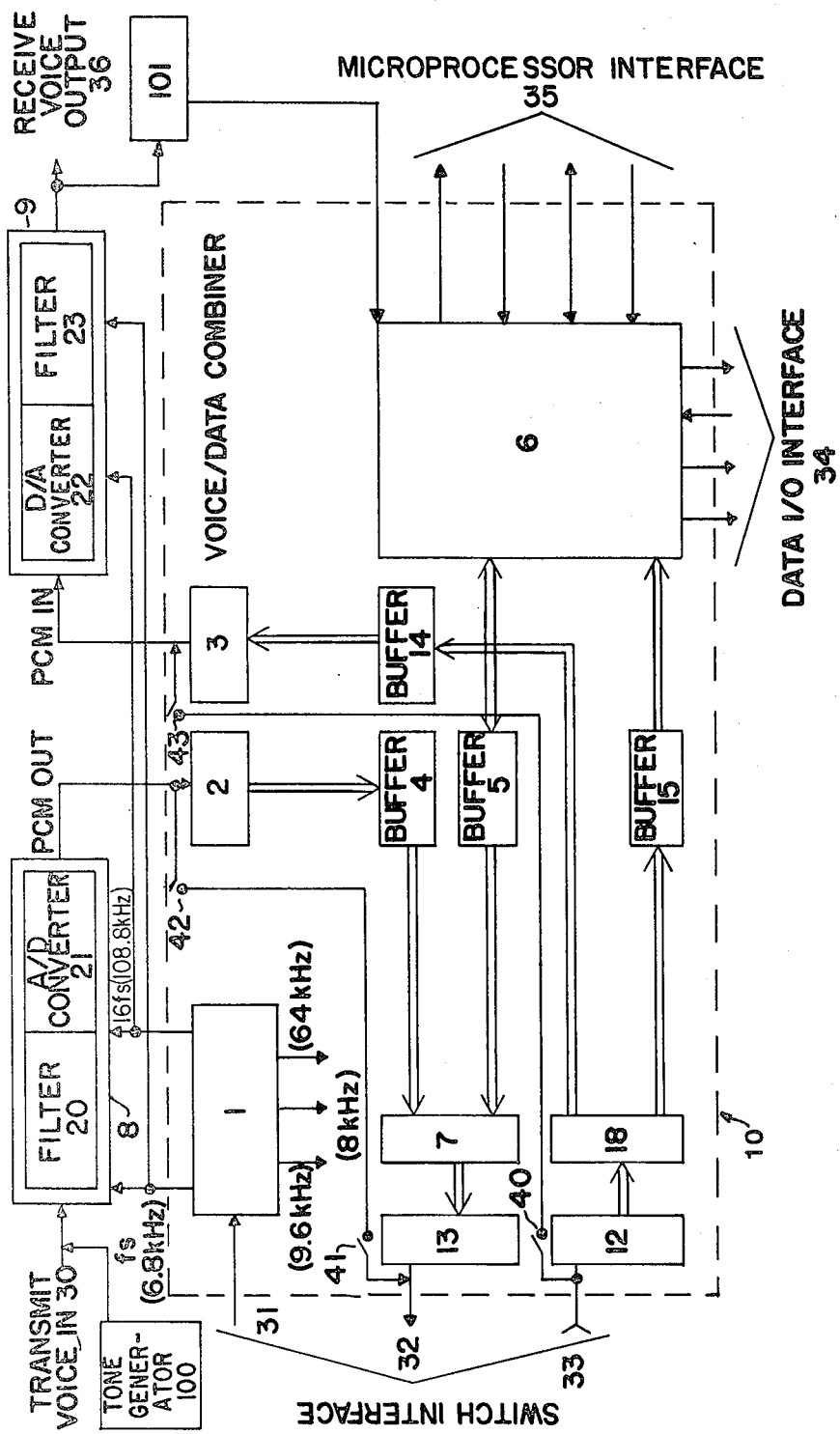
FIG. 1 is a block diagram of one embodiment of a circuit constructed in accordance with this invention.

A block diagram of a system capable of allowing simultaneous transmission of data information and voice information is shown in FIG. 1. During the periods of "full voice" operation, when voice information is transmitted without the simultaneous transmission of data information, a voice signal is input via lead 30 to pulse code modulator 8. Pulse code modulator, or "encoder", 8 is comprised of filter 20, and analog-to-digital converter 21. A device which may be used as encoder 8 is manufactured by American Microsystems, Inc., and bears their device number S3501. The pulse code modulation output from encoder 8 is then connected to output lead 32, which is connected to the switching network via a PCM transmission channel (not shown). Switches 41 and 42 allow this pulse code modulated output from encoder 8 to be directly applied to output lead 32, therefore bypassing various components contained within voice/data combiner 10. Output lead 32 is connected to the PCM transmission channel (not shown).

Also, during the full voice operation, receiver lead 33 is connected via switch 40 and switch 43 to pulse code modulation decoder 9, comprising digital-to-analog converter 22 and filter 23. Decoder 9 may comprise an S3502, also manufactured by American Microsystems, Inc. The output signal from decoder 9 is applied via lens 36 to a suitable transducer device (not shown) to provide an audible output for human use. The sampling rate for encoding and decoding the voice signal during the full-voice mode is preferably 8 kilohertz, thus allowing the transmission of 8000 8-bit words per second over the standard 64 kilobit/sec PCM channel.

A synchronization ("sync") signal is generated by the local switching network (not shown) in a well-known manner, and made available to voice/data combiner 10 via input line 31. In one preferred embodiment, this sync signal has a frequency of 400 hertz, and a 15% duty cycle. Other sync signals may be used as required for specific system performance. This sync signal is connected to phase lock loop 1 which locks on to the sync signal, and provides various clock references for controlling voice/data combiner 10, encoder 8 and decoder 9.

Figure 2:
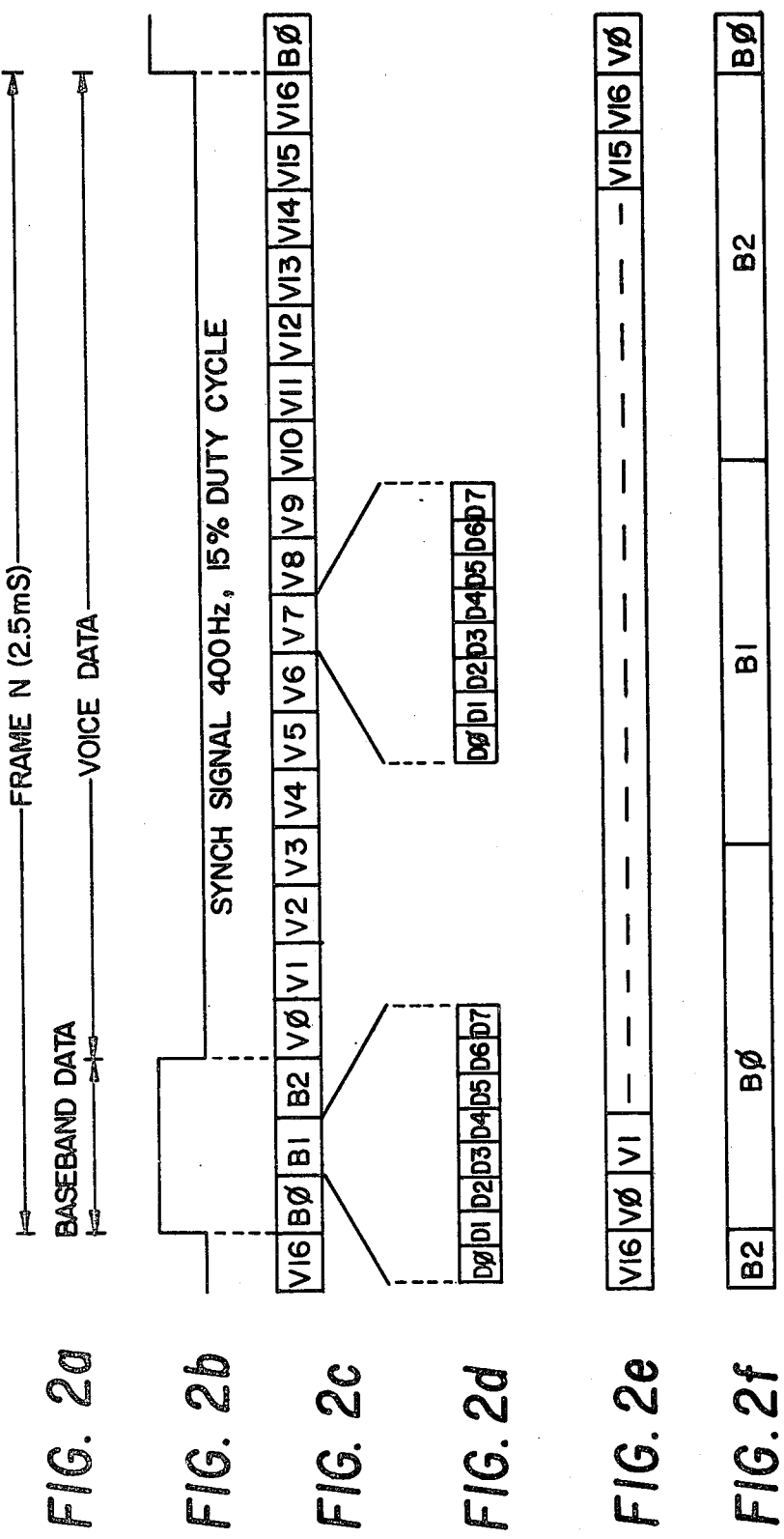
FIG. 2a is a graphical representation of the relationship of data information and voice information in a single transmission frame.
FIG. 2b is a graphical representation of a synchronizing signal for use in accordance with this invention.
FIG. 2c is another representation of the relationship of data information and voice information in a single transmission frame.
FIG. 2d illustrates the relationship of a single data byte and a single voice byte to their component bits.
FIG. 2e shows the pulse code modulated voice information.
FIG. 2f shows continuous serial data information.

During the periods when both voice information and data information are to transmitted simultaneously ("voice/data mode"), switches 40, 41, 42, and 43 are opened, thus inserting various system elements in the path between encoder 8 and switch interface lead 32, and the path between switch interface lead 33 and decoder 9. During the reception of a voice/data signal, the PCM signal is received via switch interface lead 33. The serial data stream is fed to serial-to-parallel register 12, which provides an output 8 bits wide. A device which may be used as a serial-to-parallel register is the SN74164, manufactured by Texas Instruments, Inc. This parallel output signal from serial-to-parallel register 12 is connected to demultiplexor 18. Demultiplexor 18 is clocked by a signal made available from phase lock loop 1, such that during the reception of the data portion of the PCM input signal, the parallel output from register 12 is connected by demultiplexor 18 to receive-data-buffer 15, and during the reception of the voice portion of PCM input signal, the output from register 12 is connected by demultiplexor 18 to receive-voice-buffer 14. For the system described, the sync signal depicted in FIG. 2b is high during the first three (3) bytes, which are the data bytes. Thus, this 400 Hz, 15% duty cycle sync signal is used to control multiplexor 7 and demultiplexor 18 such that data information is transmitted and received during the first three (3) bytes of each frame, and analog information is transmitted and received during the remaining seventeen (17) bytes per frame. For a system where three 8-bit data bytes are transmitted per frame, receive-data-buffer 15 is a 3 word by 8 bit memory. Similarly, for a system where 17 8-bit voice bytes are transmitted in a single frame, receive voice buffer 14 is a 17 word by 8 bit memory. For the system employing 17 words per 2.5 msec frame during the voice/data mode, encoder 8 and decoder 9 operate at 6.8 KHz, resulting in a digitized voice rate of 54.4 kilobits/sec.

During the reception of a voice/data signal, each frame has a period of 2.5 mS, as shown in FIG. 2a. Since each frame contains 20 bytes, each byte is transmitted in 125 microseconds. Thus, an 8-bit byte is output from serial-to-parallel register 12 every 125 microseconds. Each data byte is clocked into data buffer 15 at the rate of one byte per 125 microseconds, although only 3 data bytes are input during each frame, as shown in FIG. 2c. Similarly, each voice byte is shifted into voice buffer 14 in 125 microseconds, although only 17 voice bytes are shifted per frame. A sync signal (shown in FIG. 2b), available from local switching equipment (not shown) has a frequency of 400 Hz and a 15% duty cycle. Thus the sync signal is high during the first three bytes of each frame, which corresponds to the data bytes, thus allowing multiplexor 7 and demultiplexor 18 to selectively interface with voice buffers 4 and 14, and data buffers 5 and 15, as required. Multiplexor 7 may comprise two SN74157 devices manufactured, for example, by Texas Instruments, Inc. and demultiplexor 18 may comprise two SN74LS244 devices, manufactured, for example, by Texas Instruments, Inc.

Each voice and data byte is comprised of 8 bits as shown in FIG. 2d. The data is shifted out of data buffer 15 at the rate of approximately 833 microseconds/byte, or three bytes per frame, thereby providing a continuous stream of data output, as shown in FIG. 2f. This 833 microseconds/byte clock signal, as well as all other clock signals used to control the various buffers, registers, multiplexors, demultiplexors, encoders and decoders are generated by phase lock loop 1 in a well-known manner. Phase lock loop uses the sync signal, as depicted in FIG. 2b, as a reference, thereby providing accurate clock signals for the operation of the system. This data output is connected through interface and control logic 6 to a data receiver (not shown) having a microprocessor interface 35 and a data I/O interface 34. Similarly, voice information is shifted out of voice buffer 14 at approximately 147 microseconds per byte, or 17 bytes per frame, via a parallel to-serial register 3 thus providing a continuous stream of voice information to decoder 9, as shown in FIG. 2e. This continuous stream is desired to provide high quality voice transmission. If, on the other hand, the voice sampling rate remains constant, and during the voice/data mode three (3) voice bytes are replaced by three (3) data bytes during each frame, three (3) voice bytes per frame will be lost, resulting in a noticeable degradation in quality of the transmitted voice signal.

In a similar fashion, voice information is received via lead 30 of encoder 8, for sampling at approximately 147 microseconds per byte during the voice/data mode. This information is fed to serial-to-parallel register 2, which converts the serial stream of bits from encoder 8 to a parallel stream of information, 8 bits wide. The parallel voice information from register 2 is clocked into transmit voice buffer 4 at approximately 147 microseconds per byte. Voice buffer 4 is a 17 word by 8 bit memory. Data information is received from a data terminal (not shown) through interface and control logic 6 to transmit data buffer 5, at approximately 833 microseconds per byte. Transmit data buffer 5 is a 3 word by 8 bit memory. Voice information and data information are clocked out of buffers 4 and 5 at 125 microseconds per byte. During the first 3 bytes per frame, data is clocked out of the data buffer, through multiplexor 7, and to parallel-to-serial register 13. During the remaining 17 bytes per frame, voice information is shifted out of voice buffer 4, through multiplexor 7 to parallel-to-serial register 13. Parallel-to-serial register 13 converts an 8 bit wide byte into a continuous stream of binary data which is connected to switch interface lead 32 and transmitted over a standard 64 kilobit/sec PCM channel.

This invention also includes a method of queuing each station in a communications network, such that each station is either in the full voice mode, or the voice/data mode, as required. When in the full voice mode, a unique audible or subaudible tone (or set of tones) is transmitted by a first station to each associated station in communication with the first station, over the same PCM transmission channel used to transmit voice and data information, in order to signal all associated stations to switch to the voice/data mode. With stations in the voice/data mode, the same or a different tone may be transmitted over the PCM channel by one station to signal all associated stations to switch to the full voice mode. Such a tone, or set of tones, is generated by tone generator 100, of well-known design, as shown in FIG. 1, and then applied to pulse code modulator 8. The transmitted tone is detected by the tone decoder 101 of the receiving voice/data combiner, and a signal applied to interface and control logic 6, which then causes the receiving voice/data combiner 10 to enter the voice/data mode.

Figure 3:
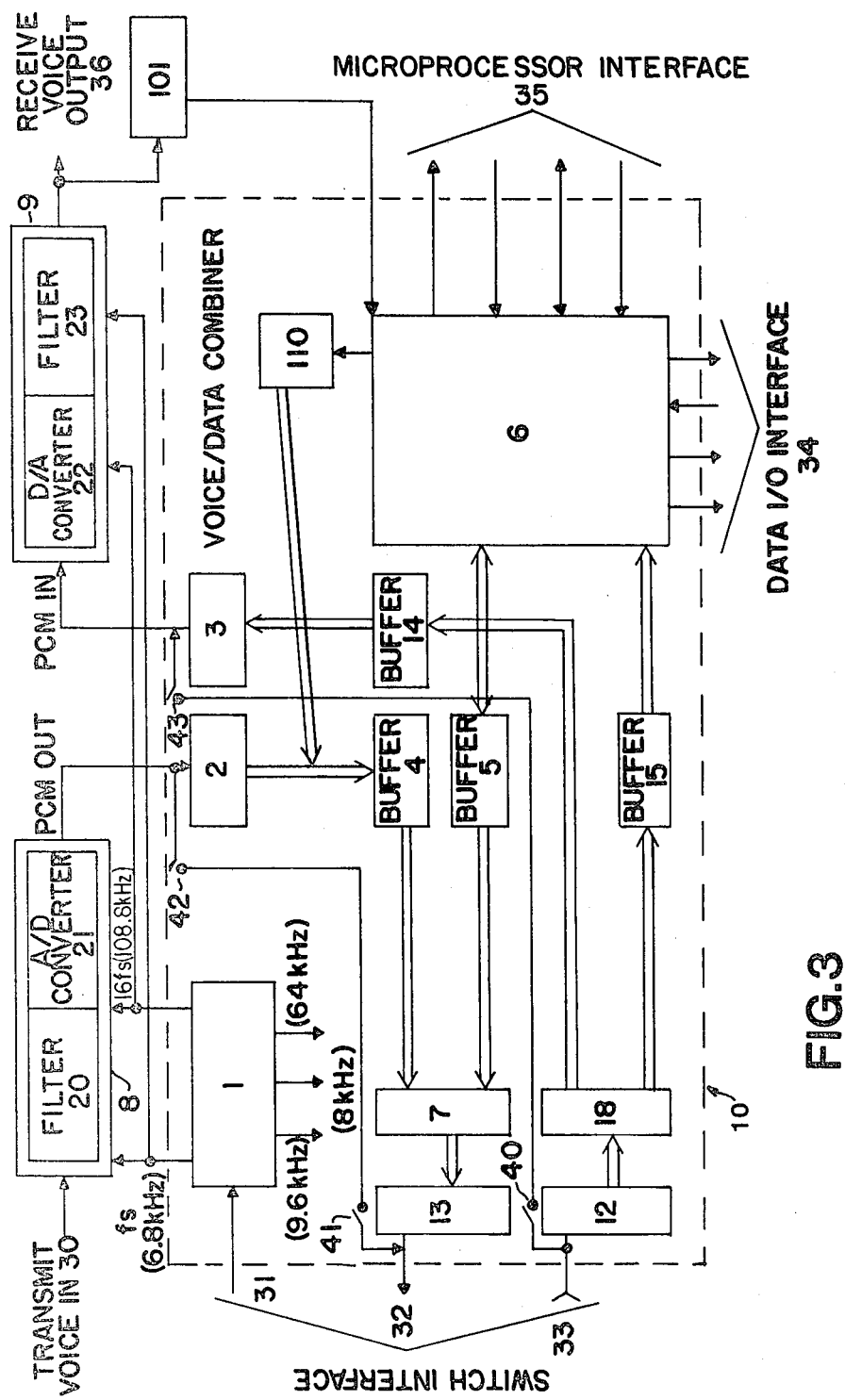
FIG. 3 is a block diagram of an alternative embodiment of the circuit of this invention as depicted in FIG. 1.

Alternatively, a special binary word, or set of words, representative of a queuing tone, or set of tones, is transmitted by one station to signal a change from the voice/data mode to the full voice mode. Thus, FIG. 3 shows an alternative embodiment of the voice/data combiner 10 of the present invention. Those elements of the circuit of FIG. 3 common to the elements of the circuit of FIG. 1 are designated by the same reference numeral. In the alternative embodiment depicted in FIG. 3, the special binary word, or set of words, representing a queuing tone signals are stored in PCM form in a read only memory queuing ROM 110 in voice/data combiner 10, and applied to parallel-to-serial register 13 as needed to be transmitted as a voice signal, as controlled by interface and control logic 6.

Figure 4:
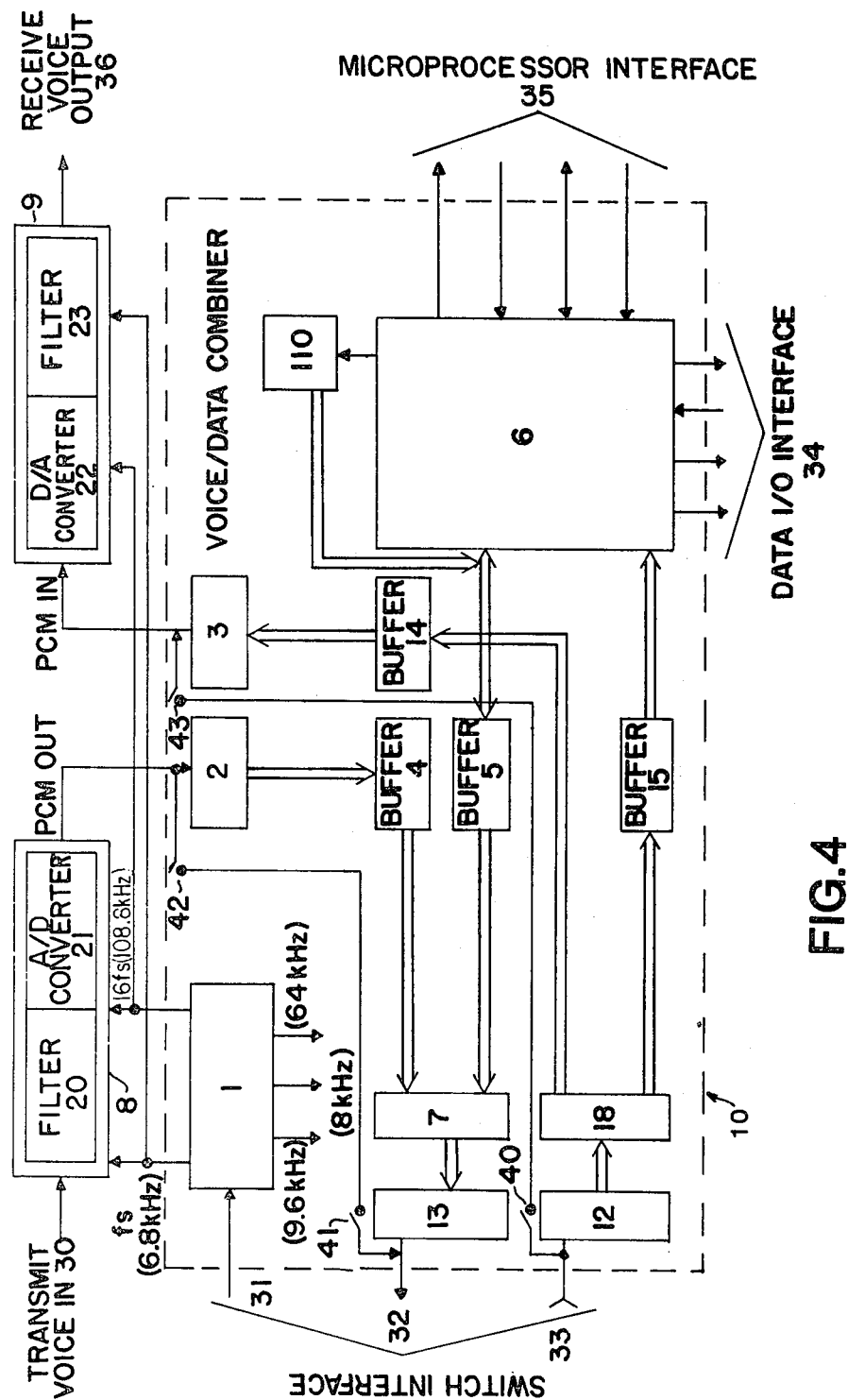
FIG. 4 is a block diagram of an alternative embodiment of the circuit of this invention as depicted in FIG. 3.

In FIG. 4 which shows an alternative embodiment of the voice/data combiner 10 of FIGS. 1 and 3, those elements common to the circuits of FIGS. 1 and 3 are designated by the same reference numerals. In this alternative embodiment, a unique data word, or set of words, are stored in ROM 110 contained within the voice/data combiner 10, and transmitted as a data signal as required to signal a transition from the voice/data mode to the full voice mode. This data signal is decoded by interface and control logic 6, which then switches voice/data combiner 10 to the full voice mode. These alternative, binary queuing signals are also transmitted over the same PCM channel used to transmit voice and data information, thus eliminating the need for an additional, independent queuing channel. The binary queuing signals must be selected in a manner that is compatible with the sampling rate of the system. For example, if the binary queuing signal is to be transmitted as a voice signal, it must have the same format (i.e., same number of bits, and the same transmission rate) as the voice signals. In a similar manner, if the binary queuing signal is to be transmitted as a data signal, it must have the same format as a data signal.

The embodiments described in this specification are illustrative only. Many other embodiments are capable of being formed using the principles of this invention.

I claim:

1. The method of transmitting a voice signal and data information on a single channel comprising:
    (a) sampling the voice signal at a first rate in the absence of data to be transmitted; and
    (b) sampling the voice signal at a second rate, lower than said first rate, and sampling the data information at a third rate lower than said first rate, during the presence of data to be transmitted.

2. The method of claim 1 wherein the combined sampling rate of said voice signal and said data information during the presence of data to be transmitted is equal to the sampling rate of said voice signal during the absence of data to be transmitted.

3. The structure for transmitting a voice signal and data information on a single channel comprising:
    means for sampling the voice signal at a first rate in the absence of data to be transmitted; and
    means for sampling the voice signal at a second rate, lower than said first rate, and sampling the data information at a third rate lower than said first rate, during the presence of data to be transmitted.

4. The structure of claim 3 wherein the combined sampling rate of said voice signal and said data information during the presence of data to be transmitted is equal to the sampling rate of said voice signal during the absence of data to be transmitted.

5. The method of transmitting a voice signal and data information on a single channel comprising the steps of:
    (a) pulse code modulating said voice signal at a first sampling rate into a series of voice frames during periods when only voice information is to be transmitted, each said voice frame comprising a plurality of voice bytes;
    (b) pulse code modulating said voice signal at a second sampling rate less than said first sampling rate into a series of voice frames during periods when both voice information and data information is to be transmitted, each said voice frame comprising a plurality of voice bytes;
    (c) merging one or more date bytes with one or more voice bytes to form a voice/data frame during periods when both voice information and data information are to be transmitted, thereby forming a series of voice/data frames comprising both voice bytes and data bytes;
    (d) transmitting said voice frames to a receiving location during periods when voice information only is to be transmitted;
    (e) transmitting said voice/data frames to said receiving location during periods when both voice information and data information are to be transmitted;
    (f) during periods when said voice/data frames are received at said receiving location, separating at said receiving location said voice bytes and said data bytes in each said voice/data frame;
    (g) pulse code demodulating at said receiving location said voice bytes into an analog voice signal at said first sampling rate during periods when only voice information is received; and
    (h) pulse code demodulating at said receiving location said voice bytes into an analog voice signal at said second sampling rate during periods when both voice information and data information are received.

6. A structure for the transmission of analog information and digital information over a single transmission channel comprising:
    analog-to-digital converter means capable of operating at a first sampling rate during periods when only analog information is to be transmitted, and at a second sampling rate less than said first sampling rate during periods when both analog information and digital information are to be transmitted, said analog-to-digital converter means having an input means for the reception of analog information and an output means from which is transmitted a digital representation of said analog information, said transmitted digital representation comprising a series of voice words, each said voice word having one or more bits;
    a first buffer memory for storing one or more voice words;
    a second buffer memory for storing one or more data words, each said data word comprising one or more bits;
    means for merging one or more voice words stored in said first buffer memory with one or more data words stored in said second buffer memory during periods when both analog information and digital information are to be transmitted; and means for transmitting only voice words during periods when only analog information is to be transmitted and for transmitting said merged voice and data words during periods when both analog information and digital information are to be transmitted.

7. A structure for the reception of analog information and digital information from a pulse code modulated transmission of a series of words, each such series of words comprising only voice words during periods when only analog information is to be received and comprising merged voice and data words during periods when both analog information and digital information are to be received, each said voice and data words having one or more bits, said structure comprising:

means for receiving a series of voice words during periods when only analog information is being transmitted and for receiving a series of merged voice and data words during periods when both analog information and digital information are being transmitted;

means for separating merged voice and data words during periods when both analog information and digital information are received;

a first buffer memory for storing one or more received voice words corresponding to said analog information;

a second buffer memory for storing one or more received data words corresponding to said digital information; and digital-to-analog converter means for converting said received voice words to an analog signal, said digital-to-analog converter means having an input means for receiving voice words and an output means from which is transmitted said analog information represented by said voice words, said digital-to-analog converter means operating at a first sampling rate during periods when only analog information is received, and at a second sampling rate less than said first sampling rate during periods when both analog information and digital information are received.

8. A structure for the transmission and reception of analog information and digital data comprising:

an analog input terminal for receiving analog input signal;

an analog-to-digital converter means having an input terminal connected to said analog input terminal and also having an output terminal, for converting said analog input signal to a digital representation thereof, said analog-to-digital converter means being capable of sampling said analog input signal at a first sampling rate during periods when only analog information is to be transmitted, and at a second sampling rate less than said first sampling rate during periods when both analog information and digital data are to be transmitted;

a pulse code modulation output terminal for connection to a transmission channel;

means for connecting said output terminal of said analog-to-digital converter means to said pulse code modulation output terminal during periods when only analog information is to be transmitted to said transmission channel;

a pulse code modulation input terminal for connection to said transmission channel;

a digital-to-analog converter means having an input terminal and an output terminal, said digital-to-analog converter means being capable of operating at said first sampling rate during periods when only voice information is to be received and at said second sampling rate during periods when analog information and digital data are to be received from said transmission channel;

means for connecting said digital-to-analog converter means input terminal to said pulse code modulation input terminal during periods when only analog information is to be received from said transmission channel;

means for storing said digital representation of said analog signal during periods when both analog information and digital data are to be transmitted to said transmission channel;

means for storing said digital data during periods when both analog information and digital data are to be transmitted to said transmission channel;

means for selectively outputting said digital representation of said analog signal and said digital data to said pulse code modulation output terminal during periods when both analog information and digital data are to be transmitted to said transmission channel;

means for separating and for storing the digital representation of analog information and the digital data received at said pulse code modulation input terminal during periods when both analog information and digital data are received from said transmission channel;

means for outputting said received digital data during periods when both analog information and digital data are received from said transmission channel;

means for applying said digital representation of analog information to said digital-to-analog converter input terminal during periods when both analog information and digital data are received from said transmission channel.

9. Structure as in claim 8 further comprising:

a tone generator connected to said analog input terminal for transmitting a queuing signal indicative of a change from the mode of transmitting only analog information to the mode of transmitting analog information and digital data simultaneously, or vice-versa;

a tone decoder connected to said digital-to-analog converter responsive to said queuing signal for controlling said sampling rate of said digital-to-analog converter and said sampling rate of said analog-to-digital converter.

10. Structure as in claim 8 further comprising:

means for transmitting a digital queuing signal indicative of a change from the mode of transmitting only analog information to the mode of transmitting analog information and digital data simultaneously, or vice-versa;

means responsive to said queuing signal for controlling said sampling rate of said digital-to-analog converter and said sampling rate of said analog-to-digital converter.

11. The method of transmitting a voice signal and data information on a single channel of claim 5 wherein said second sampling rate is such that during periods when both voice bytes and data bytes are merged to form a voice/data frame, the total number of bytes in the voice/data frame equals the number of voice bytes in said voice frame during periods when only voice information is transmitted.

* * * * *

UNITED STATES PATENT AND TRADEMARK OFFICE
CERTIFICATE OF CORRECTION

PATENT NO. : 4,377,860
DATED : March 22, 1983
INVENTOR(S) : Vishwas R. Godbole

It is certified that error appears in the above—identified patent and that said Letters Patent is hereby corrected as shown below:

In Column 2, line 59, delete "lens" and insert --bus--.

Signed and Sealed this

Nineteenth Day of July 1983

[SEAL]

Attest:

GERALD J. MOSSINGHOFF

Attesting Officer

Commissioner of Patents and Trademarks